(12) United States Patent
Zhang et al.

(10) Patent No.: US 7,999,433 B2
(45) Date of Patent: Aug. 16, 2011

(54) ROTOR WINDING SHIELD FOR A SUPERCONDUCTING ELECTRIC GENERATOR

(75) Inventors: Jiping Zhang, Winter Springs, FL (US); Robert J. Nelson, Orlando, FL (US); Peter J. Clayton, Casselberry, FL (US); William R. McCown, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/603,904

(22) Filed: Oct. 22, 2009

(65) Prior Publication Data
US 2010/0201220 A1    Aug. 12, 2010

Related U.S. Application Data

(63) Continuation of application No. 11/641,478, filed on Dec. 19, 2006, now Pat. No. 7,667,366.

(51) Int. Cl.
*H02K 1/00* (2006.01)

(52) U.S. Cl. ............... 310/216.016; 310/52; 310/89
(58) Field of Classification Search ............ 310/52–59, 310/89, 85, 216.9, 216.16
See application file for complete search history.

(56) References Cited

U.S. PATENT DOCUMENTS

| | | | |
|---|---|---|---|
| 3,609,420 A | 9/1971 | Inagaki et al. | |
| 1,891,875 A * | 6/1975 | Laskaris | 310/40 R |
| 3,891,875 A | 6/1975 | Laskaris | |
| 4,638,194 A | 1/1987 | Keefe | |
| 6,291,919 B1 | 9/2001 | Ganti et al. | |
| 6,570,292 B2 | 5/2003 | Wang et al. | |
| 6,590,305 B2 | 7/2003 | Wang et al. | |
| 6,600,251 B2 * | 7/2003 | Laskaris et al. | 310/270 |
| 6,605,885 B2 * | 8/2003 | Laskaris et al. | 310/270 |
| 6,608,409 B2 | 8/2003 | Wang et al. | |
| 6,629,356 B2 | 10/2003 | Wang et al. | |
| 6,708,503 B1 | 3/2004 | Wang et al. | |
| 6,727,633 B2 | 4/2004 | Laskaris et al. | |
| 6,762,517 B2 | 7/2004 | Wang et al. | |
| 6,794,792 B2 | 9/2004 | Wang | |
| 6,885,120 B2 | 4/2005 | Kaminski et al. | |
| 6,910,258 B2 | 6/2005 | Wang et al. | |
| 6,996,994 B2 | 2/2006 | Wang et al. | |
| 2004/0104629 A1 * | 6/2004 | Wang et al. | 310/54 |
| 2006/0119193 A1 | 6/2006 | Laskaris et al. | |

* cited by examiner

*Primary Examiner* — Thanh Lam

(57) ABSTRACT

A generator rotor core (54) carrying superconducting windings (60) and having a shield (426) over the superconducting windings (60) to prevent external magnetic fields from impinging the windings. Axial shield edges (430/434) mate with corresponding features of the rotor core (54) or with structures affixed to or supported by the core (54) to support the shield (426).

4 Claims, 5 Drawing Sheets

ROTOR WINDING SHIELD FOR A SUPERCONDUCTING ELECTRIC GENERATOR

CROSS-REFERENCE TO RELATED APPLICATIONS

This is a continuation application of U.S. patent application Ser. No. 11/641,478, filed Dec. 19, 2006, now U.S. Pat. No. 7,667,366, which is hereby incorporated by reference.

FIELD OF THE INVENTION

The invention relates generally to superconducting generators and specifically to a non-magnetic rotor shield for protecting superconducting rotor windings and optimizing the production of magnetic flux generated by the rotor windings.

BACKGROUND OF THE INVENTION

An electric generator transforms rotational energy into electrical energy according to generator action principles of a dynamoelectric machine. The turning torque supplied to a rotating rotor by a combustion or steam-driven turbine is converted to alternating current (AC) electricity, typically three-phase AC, in a stationary stator that surrounds the rotor. The generator is a mechanically massive and electrically complex structure, supplying output power up to 2,222 MVA at voltages up to 27 kilovolts. Electrical generators are the primary power producers in an electrical power system.

As shown in the cross-sectional view of FIG. 1, a conventional electric generator 10 comprises a substantially cylindrical rotor 12 supporting axial field windings or rotor windings 13. A direct current (DC) supplied to the rotor windings 13 produces a constant magnetic flux field that rotates with the rotating rotor within a stationary armature or stator 14. One end 15 of the rotor 12 is drivingly coupled to a steam or gas driven turbine (not shown in FIG. 1) for providing rotational energy to turn the rotor 12. The opposing end 16 is coupled to an exciter (not shown) for supplying the direct current to the rotor windings 13. An alternating current is generated in the stationary stator windings as the rotor's magnetic flux field crosses the stator windings. Rotor rotation subjects the rotor 12 and the rotor windings 13 to radial centrifugal forces that may result in radial distortion of these components.

The stator 14, a shell-like structure, encloses the rotor and comprises a core 17 further comprising a plurality of thin, high-permeability circumferential slotted laminations 17A placed in a side-by-side orientation and insulated from each other to reduce eddy current losses. Stator coils are wound within the inwardly directed slots. The AC electricity induced in the stator windings by action of the rotor's rotating magnetic field flows to terminals 19 mounted on the generator frame for connection to an external electrical load. Three-phase alternating current is produced by a generator comprising three independent stator windings spaced at 120° around the stator shell. Single-phase alternating current is supplied by a stator having a single stator winding.

The rotor 12 and the stator 14 are enclosed within a frame 20. Each rotor end comprises a bearing journal (not shown) for cooperating with bearings 30 attached to the frame 20.

A generator cooling system removes heat produced by current flow through the generator conductors, including the direct current flow through the rotor windings 13 and the alternating current induced in the stator coils. Additional heat sources include mechanical losses, such as windage caused by the spinning rotor, and friction at the bearings 30. The rotor 12 carries a blower 32 for forcing cooling fluid through the generator elements. Coolers 36 receive and cool the cooling fluid to release the heat absorbed from the generator components. The cooling fluid is then recirculated back through the generator components.

To increase generator output and efficiency and reduce generator size and weight, conventional copper rotor windings are replaced by superconducting windings (filaments) that exhibit effectively no resistance to current flow when maintained below the material's critical temperature ($T_c$). Superconductivity is a phenomenon observed in several metals and ceramic materials when the material is cooled to temperatures ranging from near absolute zero (0° K. or −273° C.) to a liquid nitrogen temperature of about 77° K. or −196° C. The critical temperature for aluminum is about 1.19° K. and for $YBa_2Cu_3O_7$ (yttrium-barium-copper-oxide) is about 90° K. Yttrium-barium-copper-oxide (one example of a high temperature superconducting (HTS) material) is commonly used for the rotor windings of a superconducting generator.

Since the superconducting materials exhibit substantially no electrical resistance when maintained at or below their critical temperature, these materials can carry a substantial electric current for a long duration with insignificant energy losses. To maintain the superconducting conductors at or below their critical temperature, coolant flow paths carrying coolant supplied from a cryogenic cooler are disposed adjacent or proximate the windings. Typical coolants comprise liquid helium, liquid nitrogen and liquid neon.

Disadvantageously, the HTS rotor windings are sensitive to mechanical bending and tensile stresses that can cause premature degradation and winding failure (e.g., an open circuit). For example, bends formed in the HTS rotor windings to circumscribe the cylindrical rotor core induce winding stresses. Normal rotor torque, transient fault condition torques and over-speed forces induce additional stress forces in the rotor windings. These over-speed and fault conditions substantially increase the centrifugal force loads on the rotor coil windings beyond the loads experienced during normal operating conditions.

The co-pending commonly-owned application entitled Superconducting Coil Support Structures (Attorney docket number 2006P13505US) describes and claims HTS winding support structures that support the windings against these loads. This application is incorporated by reference herein. The support structures also limit heat transfer from the "warm" (i.e., approximately room temperature) rotor core to the "cold" (i.e., cryogenically cooled) HTS windings. In addition to conductive thermal paths in the support elements, it is desired to maintain the HTS rotor windings in a vacuum condition to limit radiative heat transfer from the rotor core to the superconducting windings.

AC electricity available at the stator terminals is supplied to an electrical power grid through a transmission and distribution system. Grid fault currents, e.g. caused by a lightning-induced current spike on the grid, are coupled to the stator through the intervening transmission and distribution lines. The grid fault currents generate a stator fault current and an attendant strong transient magnetic flux that is magnetically coupled to the HTS rotor windings. This flux can generate a significant torque on the rotor core and the HTS winding, potentially damaging the HTS winding and its support structures. The transient magnetic fields can also be caused by system or internal short circuits, transmission switching operations, synchronizing operations, transient voltages on the transmission system and loss of synchronism between the generator and the grid. In addition to the undesired mechanical forces produced by these transient torques, any magnetic field coupled into the rotor windings causes undesired alternating current (AC) losses in the HTS conductors.

Although rotor winding support structures can be designed to allow the HTS conductors to withstand the additional torque introduced by these transient magnetic fields, such support structures increase the support mass and may introduce additional undesired thermal paths between the warm rotor core and the cold HTS windings.

Typically however, the rotor windings are shielded to prevent transient magnetic fields from reaching the rotor HTS windings. An electromagnetic shield, comprising copper or aluminum for example, encloses the HTS rotor windings to prevent magnetic flux from coupling to the rotor, thereby avoiding the consequent torques induced on the HTS windings. The shield is also referred to as a non-magnetic shield since it is constructed from non-magnetic material.

For relatively small electric generators the shield comprises a thin tubular or cylindrical structure surrounding the rotor core and the HTS windings and attached to the rotor core end faces. However, it is a substantial challenge to manufacture, assemble and balance a large and continuous cylindrical shield structure with the precision and tolerances required for a large electrical generator. According to one embodiment, a tubular shield having a relatively thin wall surface is supported by the rotor shaft with a tight clearance between the rotor and the shield. Gravity loading deforms the thin tube into an elliptical shape and interface contact is made at the top and bottom surfaces of the rotor shaft. Further, the considerable rotor weight tends to cause rotor sag. These effects lead to fretting damage due to relative motion (albeit a small displacement) at the interface of the rotor core and the non-magnetic shield. Alternatively, the tube shield has relatively thick wall surface with a larger gap between the shield and the rotor. Little or no fretting damage occurs in this configuration, but the shield must be sufficiently thick to support its own weight.

The rotor core and the surrounding non-magnetic shield independently vibrate at a different resonant frequency with a different vibration pattern. These effects create additional dynamic loads on the rotor core and the HTS windings. The cumulative effect of the interface contact forces and the vibration forces create extremely high stresses on the rotating non-magnetic shield.

If the rotor core and the HTS rotor windings are enclosed in a vacuum vessel (comprising stainless steel for example) additional design difficulties arise. If the shield and the vacuum vessel are both cylindrical with the vacuum vessel nested within the shield they are preferably joined to maintain the vacuum condition. Joining the dissimilar metals of the vacuum vessel and the shield is problematic. Further, the disadvantages associated with the large generator shield discussed above are exacerbated by the addition of the vacuum vessel.

It is known by those skilled in the art that the rotor must be balanced to minimize undesired rotor torques. During the balancing process balancing weights are added to the rotor body at various locations along its axial length to balance the rotor at its operating speed. Effective balancing requires access to the entire rotor body surface to permit placement of the balancing weights as desired to effect a balanced condition. A shield that covers the entire rotor requires performing the balancing operation prior to placement of the shield over the rotor. But such a process increases production cycle time and process costs. Also, this pre-shield installation balancing operation is conducted with the rotor at ambient temperature, but the rotor operates at cryogenic temperatures. Undoubtedly, the lower temperature affects the rotor's balance. Thus it is preferable to balance the rotor under cryogenic operating conditions with access to the entire rotor surface to place balance weights as required.

BRIEF SUMMARY OF THE INVENTION

One embodiment of the invention comprises a rotor for an electric generator. The rotor comprises a rotor core defining a first and a second axially extending flat surface region, each of the first and the second flat surface regions bounded by first and second opposing edges; a superconducting winding circumscribing the rotor core, axial segments of the superconducting winding disposed within the first and the second flat surface regions; a plurality of first and a plurality of second core extension elements mating with the respective first edge of the first and the second flat surface regions; a first arcuate shield extending axially along the rotor core enclosing the axial segment within the first flat surface region, the first shield having a first axial edge mating with a first edge of the plurality of first core extension elements and a second axial edge mating with the second edge of the first flat surface region and a second arcuate shield extending axially along the rotor core enclosing the axial segment within the second flat surface region, the second shield having a first axial edge mating with a first edge of the plurality of second extension elements and a second axial edge mating with the second edge of the second flat surface region.

In another embodiment the invention comprises a rotor shield for a rotor core of an electric generator comprising a superconducting winding. The rotor shield comprises an arcuate sheet of electrically conductive non-magnetic material for shielding the superconducting winding and each one of a first and a second axial edge of the arcuate sheet having a first dovetail feature for mating with a second dovetail feature of a respective first and a second core element.

BRIEF DESCRIPTION OF THE DRAWINGS

The foregoing and other features of the invention will be apparent from the following more particular description of the invention, as illustrated in the accompanying drawings in which like reference characters refer to the same parts throughout the different figures. The drawings are not necessarily to scale, emphasis instead being placed upon illustrating the principles of the invention.

DESCRIPTION OF THE PREFERRED EMBODIMENTS

Figure 1:
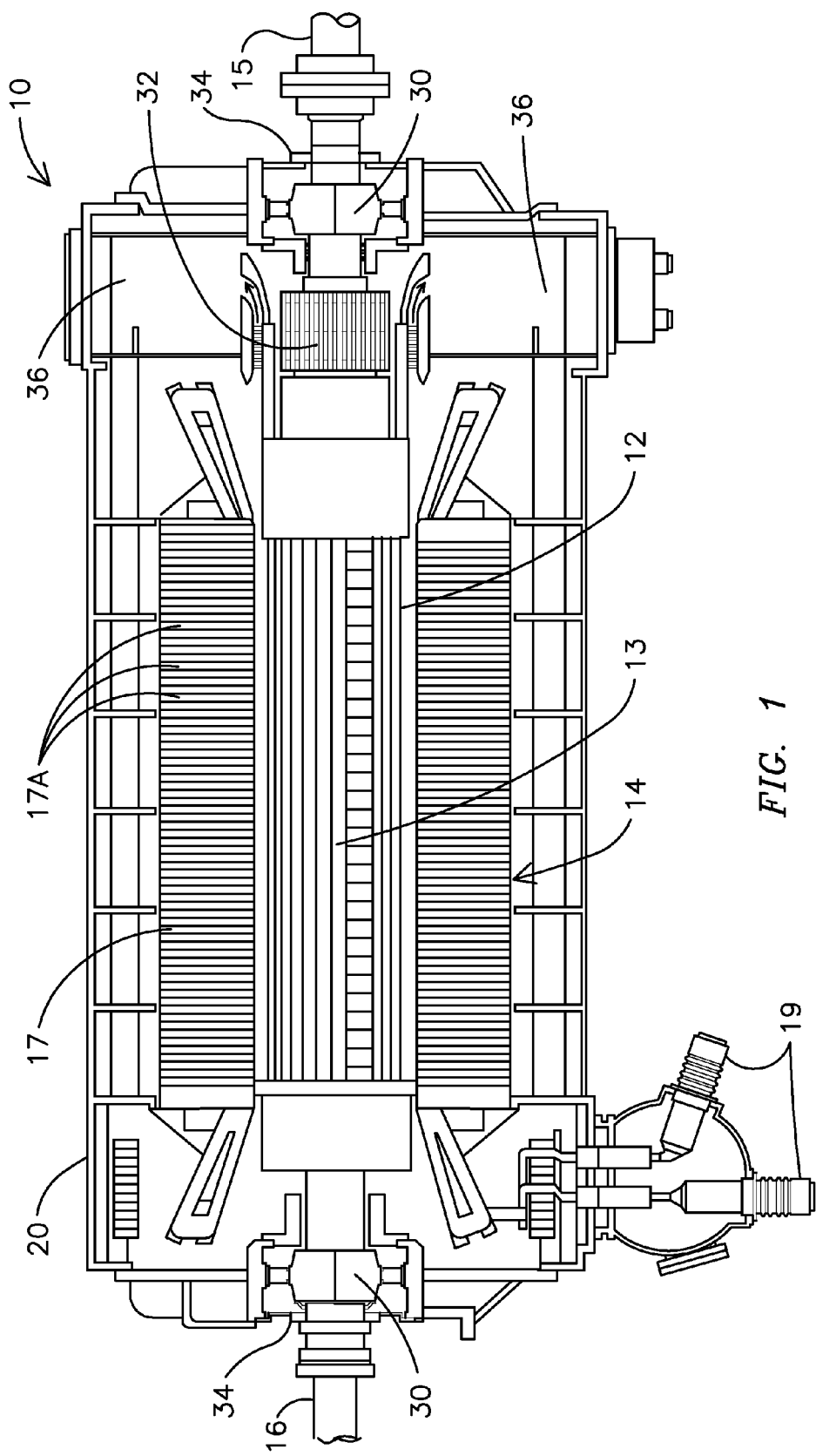
FIG. 1 is a cross-sectional view of a prior art electric generator.

Before describing in detail the particular non-magnetic rotor winding shield in accordance with the present invention, it should be observed that the present invention resides primarily in a novel and non-obvious combination of hardware elements and method steps. Accordingly, these elements and steps have been represented by conventional elements and steps in the drawings, showing only those specific details that are pertinent to the present invention so as not to obscure the disclosure with details that will be readily apparent to those skilled in the art having the benefit of the description herein.

The following embodiments are not intended to define limits as to the structures or methods of the invention, but only to provide exemplary constructions. The embodiments are permissive rather than mandatory and illustrative rather than exhaustive.

A rotor shield of the present invention overcomes the various limitations described above. The shield of the present invention effectively prevents stator-originating transient time-varying magnetic fields from impinging rotor HTS windings, but allows access to substantially all of the rotor body for the placement of balancing weights. Also, the shield and the rotor body cooperate to transfer transient loads (generated during fault conditions) and steady state loads imposed on the shield to the rotor body.

It is known that the shield provides a shielding function only for magnetic fields that vary in time at the surface of the rotor. Since the shield rotates with the rotor flux (which is generated by a DC current) there is no time-varying rotor flux component and thus the shield does not impede the main rotor flux. The shape of the rotor pole tends to reduce the magnetomotive force (MMF) drop of the rotor pole to a low level and thereby ensures that the rotor leakage flux remains at a relatively low level.

However, the shield shields the HTS windings from stator magnetic flux components that are time-varying from the perspective of the rotor. As is known, a time-varying field generates a time-varying voltage on the surface of the conductive shield responsive to the change of magnetic flux with time. A current flows within the shield responsive to this voltage and generates a time-varying magnetic field that counters the external time-varying magnetic field. Thus the time-varying field is prevented from reaching the rotor core and the HTS windings.

Figure 2:
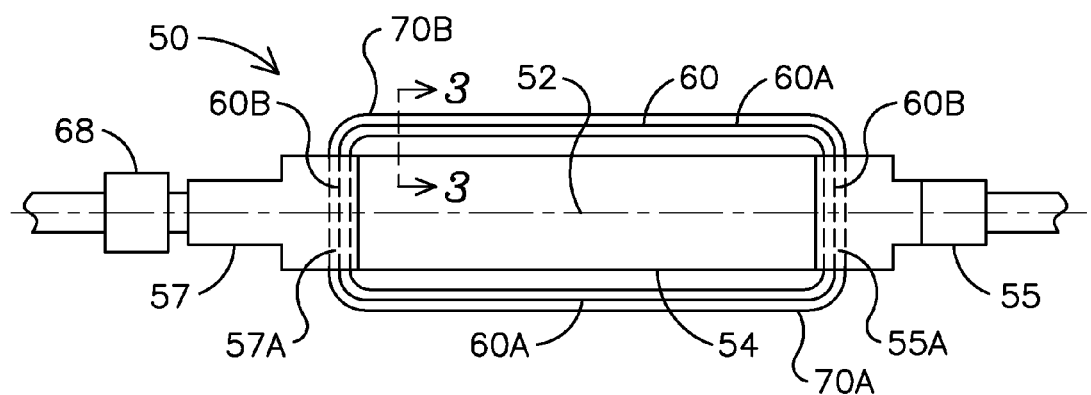
FIG. 2 is an illustration of a rotor for use in a superconducting dynamoelectric machine according to the teachings of the present invention.

FIG. 2 illustrates a superconducting rotor 50 defining a longitudinal axis 52 and comprising a generally cylindrically-shaped core 54 and coaxially aligned rotor end segments 55 and 57 each attached to an end surface of the core 54. A material of the core 54 exhibits a high magnetic permeability, e.g. a ferromagnetic material such as iron, for increasing the magnetic flux generated by the rotor windings.

The superconducting rotor 50 further comprises a generally longitudinally-extending, racetrack-shaped superconducting (HTS) coil or winding 60 comprising axial segments 60A connected by radial segments 60B, the latter extending through openings 55A and 57A defined between end surfaces of the core 54 and the respective end segments 55 and 57. Non-magnetic shields 70A and 70B of the present invention are each supported by the rotor core 54 and enclose the superconducting coil segments 60A.

The end segment 57 further comprises a cryogenic transfer coupling 68 that supplies cooling fluid (cryogenic fluid) from a cryogenic cooler (not shown) to closed coolant flow paths or channels in the superconducting coil 60 to maintain the superconducting coil 60 at or below its critical temperature. From the channels, the coolant returns to the transfer coupling 68 then to the cooler for lowering the coolant temperature. The coolant is then circulated back to the coolant flow paths.

Figure 3:
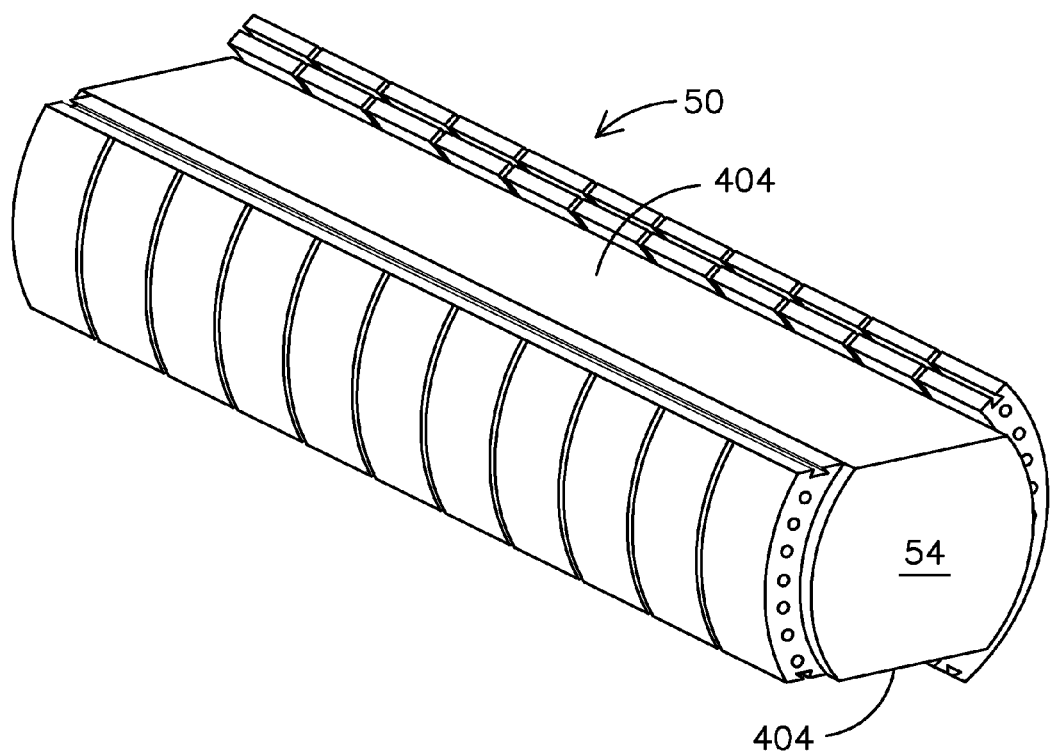
FIGS. 3, 4, 5A, 5B and 6 are perspective views of a rotor for use with a shield of the present invention.

The rotor 50 for use with the magnetic shield of the present invention is illustrated in greater detail in FIG. 3, absent the rotor end segments 55 and 57. The rotor core 54 comprises oppositely-disposed axially-extending flat surface regions 404. The flat surfaces balance the stiffness of the rotor to avoid excessive dynamic forces.

Figure 4:
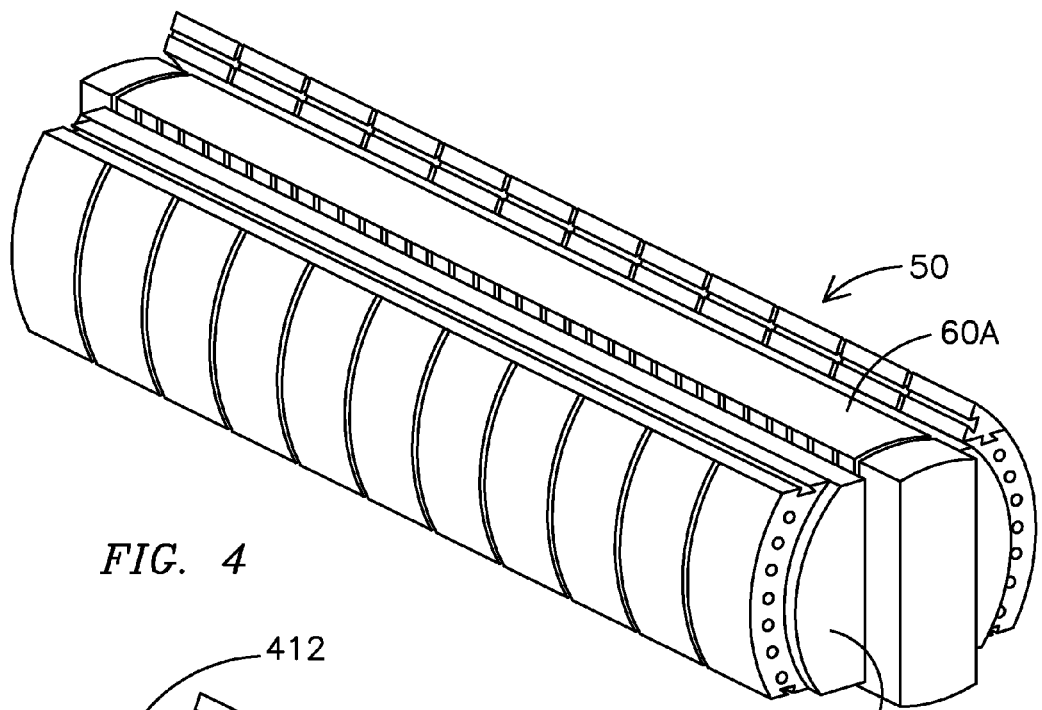
Figure 5A:
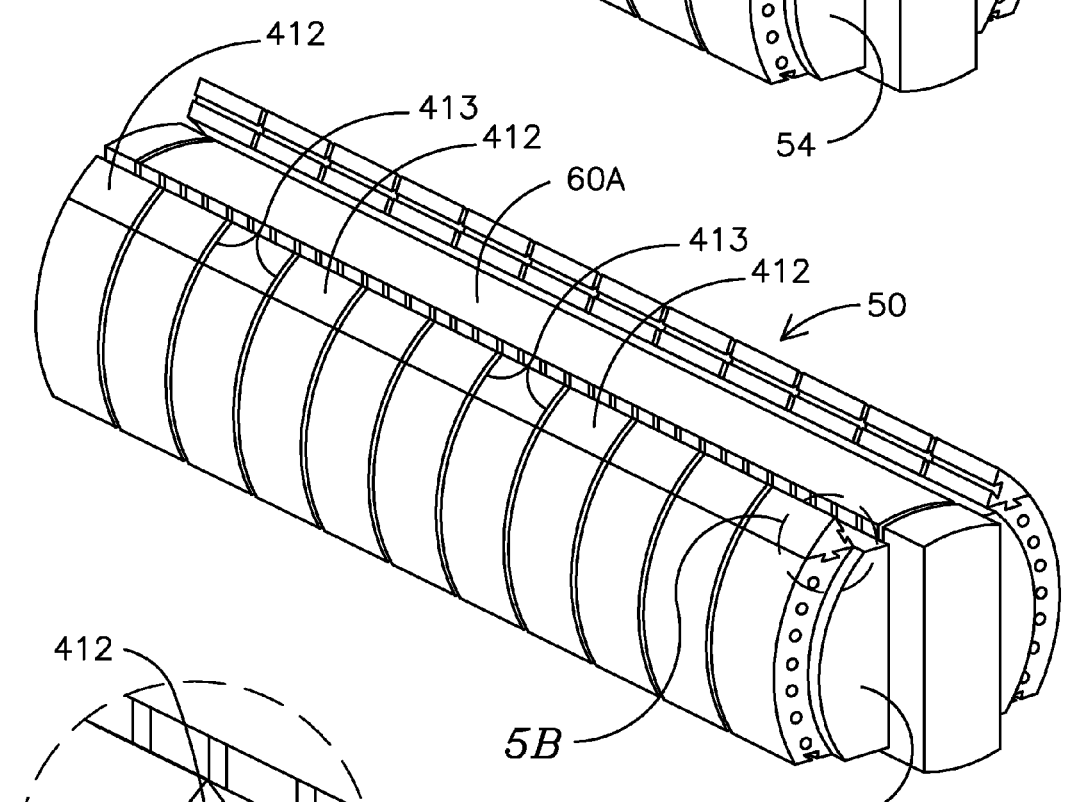
Figure 5B:
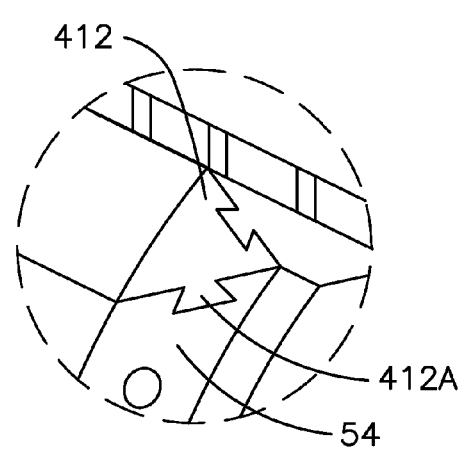

FIG. 4 illustrates the rotor core 54 and the superconducting winding segment 60A supported by the aforementioned HTS winding support structures attached to the flat surface regions 404. As illustrated in FIG. 5A, a plurality of blocks 412 (also referred to as core extensions and comprising a ferromagnetic material such as steel) are disposed in a side-by-side configuration axially along one exposed edge of each flat surface region 404, with a spacer 413 intermediate two adjacent blocks. Typically, the blocks 412 are installed after the superconducting winding 60 is attached to the core 54. In one embodiment the blocks comprise a dovetail surface 412A that mates with a corresponding dovetail groove in the rotor core 54. See FIG. 5B.

As can be seen, the blocks 412 partially close the circumferential core gap formed by the flat surface regions 404. The blocks 412 are functional elements of the core 50 (i.e., a material of the blocks 412 comprises a ferromagnetic material) and thus are formed from a core-like material. The blocks 412 also support the magnetic shield of the present invention as described further below. The blocks 412 can be installed beginning from either end of the core 50.

In lieu of individual blocks 412, the circumferential gap can be closed by a single elongated piece (formed from ferromagnetic material) extending a length of the rotor core 50.

Figure 6:
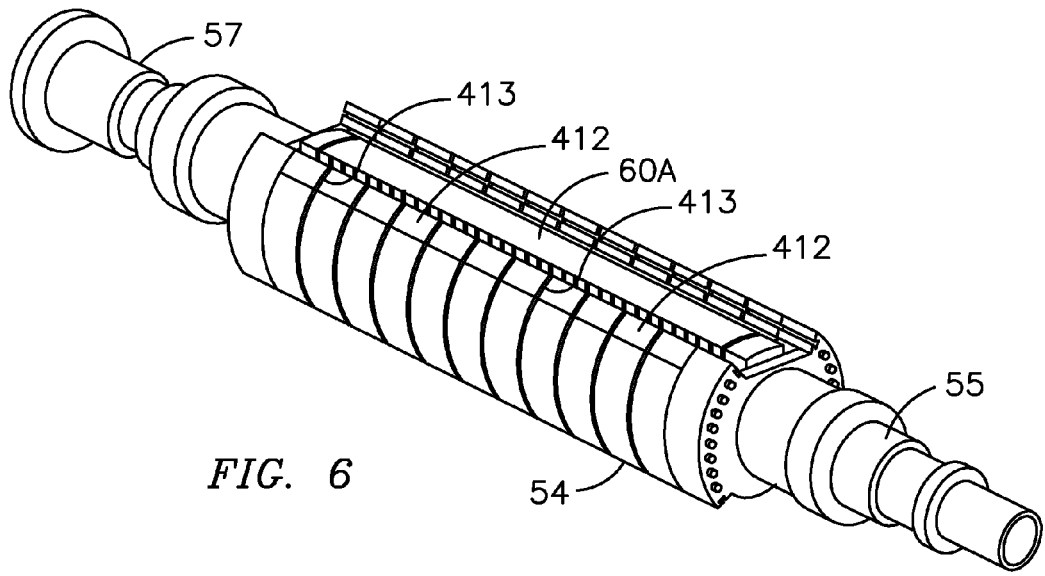

FIG. 6 illustrates the partially assembled rotor core 54, including the superconducting winding segment 60A, the blocks 412 and the spacers 413, with end segments 55 and 57 affixed thereto according to known techniques.

Figure 7:
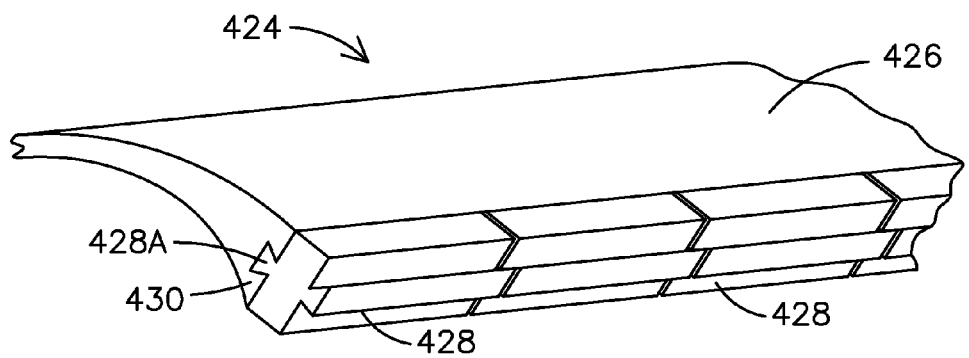
FIGS. 7 and 8 are views of a non-magnetic shield constructed according to the teachings of the present invention.
Figure 8:
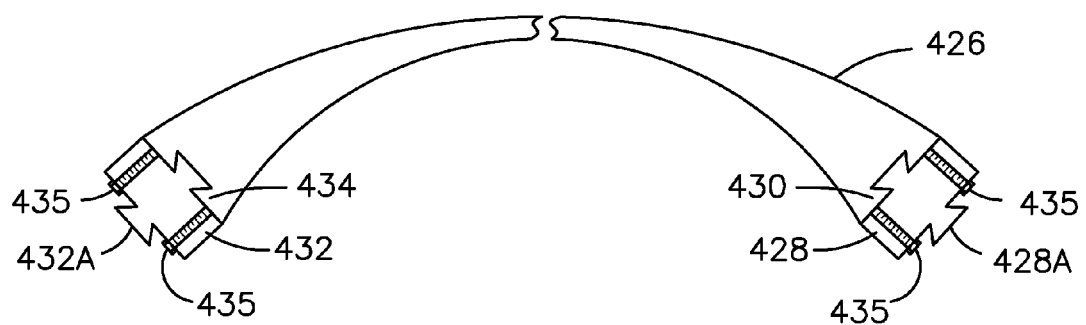

FIGS. 7 (a perspective view) and FIG. 8 (an end view) illustrate one embodiment of a non-magnetic shield assembly 424 constructed according to the teachings of the present invention, comprising an arcuate shield 426 preferably constructed of aluminum (or another non-magnetic material). A plurality of adjacent sliding shoes 428 mate with the shield 426 at a dovetail interface along a shield edge surface 430. A plurality of sliding shoes 432 similarly mate with an opposing edge surface 434 of the arcuate shield 426. Each of the sliding shoes 428 and 432 is attached to the shield 426 by a plurality of fasteners, such as bolts 435 as indicated in FIG. 8. In one embodiment, adjacent sliding shoes 428 and adjacent sliding shoes 432 are spaced apart to avoid fretting damage to the shoes or a spacer member is inserted therebetween.

A dovetail surface 432A of the shoe 432 is received within a mating dovetail groove 438 in the rotor core 54. See FIGS. 8 and 9. A dovetail surface 428A of the oppositely disposed sliding shoe 428 is similarly attached (using a dovetail mating technique) to an exposed surface of each of the magnetic steel blocks 412.

To install the non-magnetic shield 426, the sliding shoes 428 and 432 are affixed to the shield 426. The surfaces 432A and 428A are aligned with respective mating grooves in the rotor core 54 and the magnetic steel blocks 412. The non-magnetic shield assembly 424 is then slid axially along the rotor core 54 to cover and enclose the superconducting winding portion 60A.

Similarly, a second non-magnetic shield is affixed to the rotor core 54 to close the oppositely disposed flat surface region 404 and the superconducting winding portion 60A (see FIG. 2) affixed thereto.

Figure 10:
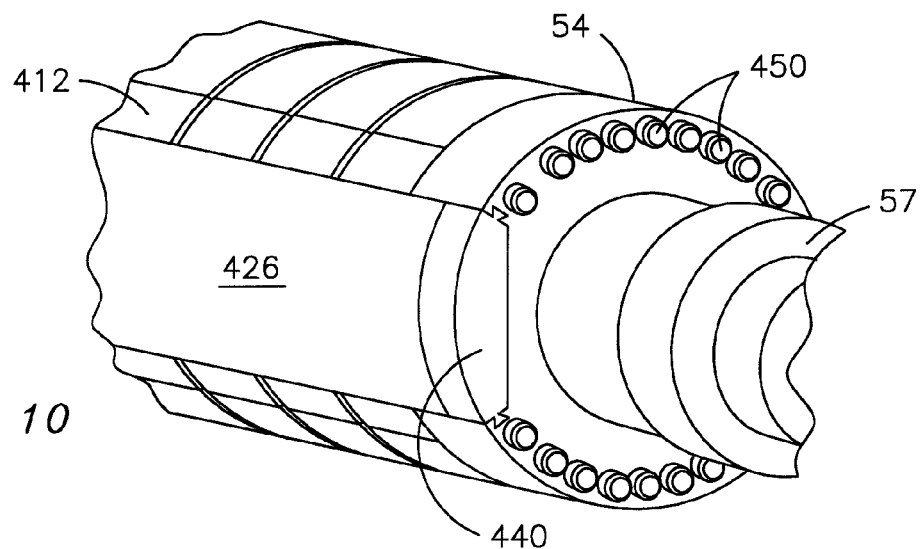

As illustrated in FIG. 10, an end cap 440 is attached to the rotor core 54 to close open ends formed when the non-magnetic shield assembly 424 is in place on the rotor core. Another end cap is similarly situated at the other end of the non-magnetic shield assembly 424. As can also be seen in FIG. 10, the non-magnetic shield assembly 424 and the end caps 440 completely enclose the super conducting winding portion 60A.

Figure 9:
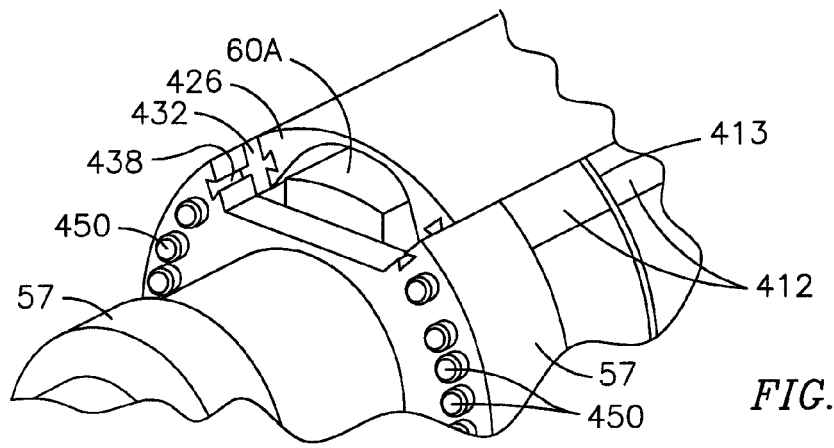
FIGS. 9 and 10 are perspective views of a rotor including the non-magnetic shield of the present invention.

FIGS. 9 and 10 further illustrate bolts 450 for attaching the end segment 57 to the core 54.

Use of the non-magnetic shield assembly 424 in lieu of a shield that completely surrounds the rotor as known in the prior art, substantially reduces dynamic loads on the rotor core 54 and on the assembly 424 during both steady state and transient load conditions, while shielding the HIS winding 60 from transient magnetic fields.

Figure 11:
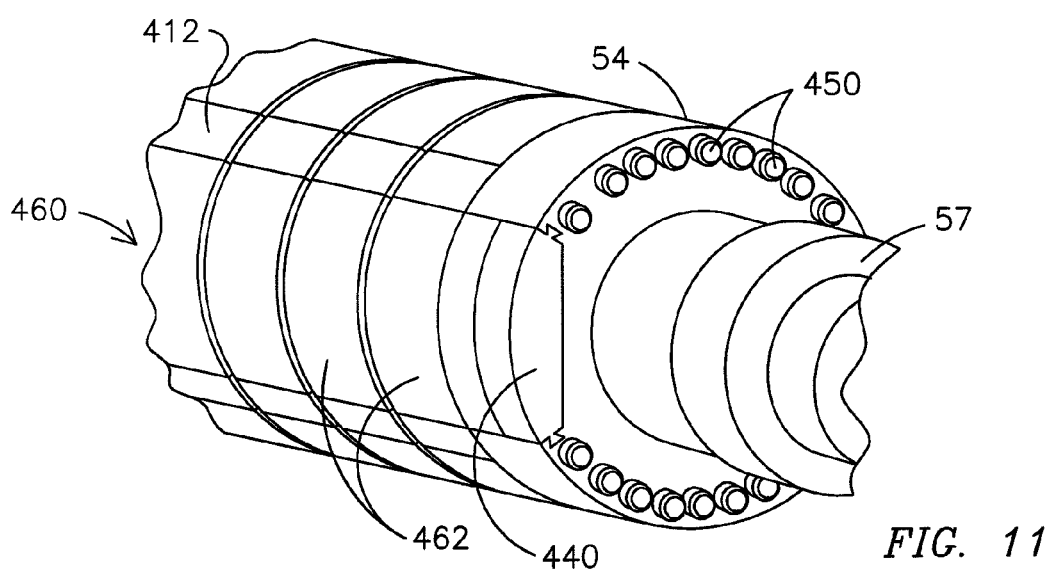
FIG. 11 is an illustration of another embodiment of a non-magnetic shield of the present invention.

In another embodiment illustrated in FIG. 11, a magnetic shield 460 comprises a plurality of side-by-side curved elements or bands 462 extending axially along the rotor core 54. The elements 462 may be spaced apart, but electrical conductivity must be maintained between the elements 462.

While the present invention has been described with reference to preferred embodiments, it will be understood by those skilled in the art that various changes may be made and equivalent elements may be substituted for the elements thereof without departing from the scope of the invention. The scope of the, present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A rotor shield for a rotor core of an electric generator comprising a superconducting winding disposed in a flat axial region of the rotor core, the rotor shield comprising:
    an arcuate sheet of electrically conductive non-magnetic material having first and second dovetail features spaced-apart circumferentially along opposing axial edges of the arcuate sheet; and
    the first and second dovetail features of the arcuate sheet for mating with first and second axial dovetail features of a respective first and a second core element, the arcuate sheet forming an arc segment covering the superconducting winding with the dovetail features disposed proximate an exposed surface of the rotor core.

2. The rotor shield of claim 1 wherein the sheet comprises a plurality of arcuate bands arranged in a side-by-side orientation.

3. The rotor shield of claim 1 wherein the first core element comprises a first plurality of axial side-by-side core extensions for receiving the first dovetail feature of the arcuate sheet and the second core element comprises a second plurality of axial side-by-side core extensions for receiving the second dovetail feature of the arcuate sheet.

4. The rotor shield of claim 1 further comprising a first shoe intermediate the first axial edge of the arcuate sheet and the first core element, the first shoe affixed to the first axial edge of the arcuate sheet and slidably engaged to the first core element, and the rotor shield further comprising a second shoe intermediate the second axial edge of the arcuate sheet and the second core element, the second shoe affixed to the second axial edge of the arcuate sheet and slidably engaged to the second core element.

* * * * *